US007283062B2

(12) United States Patent
Hoiness et al.

(10) Patent No.: US 7,283,062 B2
(45) Date of Patent: Oct. 16, 2007

(54) MAPPING IN MOBILE DATA COLLECTION SYSTEMS, SUCH AS FOR UTILITY METER READING AND RELATED APPLICATIONS

(75) Inventors: Steve Hoiness, Spokane, WA (US); Renee Hoke, Cheney, WA (US); Charles G. Edwards, Spokane, WA (US); Jeffrey N. Blum, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 164 days.

(21) Appl. No.: 10/903,866

(22) Filed: Jul. 30, 2004

(65) Prior Publication Data

US 2006/0022841 A1  Feb. 2, 2006

Related U.S. Application Data

(60) Provisional application No. 60/592,053, filed on Jul. 28, 2004.

(51) Int. Cl.
 *G08B 23/00* (2006.01)
(52) U.S. Cl. .................. 340/870.02; 705/412
(58) Field of Classification Search ........... 340/870.02, 340/870.03; 705/412
 See application file for complete search history.

(56) References Cited

U.S. PATENT DOCUMENTS

| | | | | |
|---|---|---|---|---|
| 5,194,860 A | * | 3/1993 | Jones et al. ............. | 340/870.02 |
| 5,270,704 A | * | 12/1993 | Sosa Quintana et al. ..................... | 340/870.02 |
| 5,278,551 A | * | 1/1994 | Wakatsuki et al. ..... | 340/870.02 |
| 5,617,084 A | * | 4/1997 | Sears .................... | 340/870.02 |
| 6,006,212 A | * | 12/1999 | Schleich et al. ............ | 705/412 |
| 6,014,089 A | | 1/2000 | Tracy et al. | |
| 6,300,881 B1 | | 10/2001 | Yee et al. | |
| 6,657,549 B1 | | 12/2003 | Avery et al. | |

(Continued)

FOREIGN PATENT DOCUMENTS

EP 1265450 A2 12/2002

(Continued)

OTHER PUBLICATIONS

TRACE® Automated Meter Reading System Operation Brief, BadgerMeter, Inc., Milwaukee, WI, 2001, 2 pages.

(Continued)

*Primary Examiner*—Albert K. Wong
(74) *Attorney, Agent, or Firm*—Perkins Coie LLP

(57) ABSTRACT

A mobile data collection system may perform or facilitate monitoring and management of mobile automatic meter reading (MAMR) activities via out of route meter read identification and graphical route playback. In identifying out of route endpoints, the mobile data collection system receives an indication of each of the endpoints included in a predetermined meter reading route. The mobile data collection system executes the route detecting endpoints and collecting location information relating to out of route endpoints that are not included in the predetermined route. Location information identifying the out of route endpoints is then presented to a user. In facilitating graphical route playback, the mobile data collection system collects information as it progresses through the route. The collected information may then be used in a graphical playback of the route, which shows the mobile data collection system dynamically traveling through the route (e.g., on a map) and reading endpoints.

15 Claims, 15 Drawing Sheets

U.S. PATENT DOCUMENTS

| | | | |
|---|---|---|---|
| 6,657,552 | B2 | 12/2003 | Belski et al. |
| 6,778,099 | B1 | 8/2004 | Meyer et al. |
| 6,996,215 | B2 * | 2/2006 | MacConnell ........... 379/106.03 |
| 7,109,882 | B2 * | 9/2006 | Angelis et al. ........ 340/870.02 |
| 2002/0188702 | A1 | 12/2002 | Short et al. |
| 2004/0019518 | A1 | 1/2004 | Abraham et al. |
| 2004/0030745 | A1 | 2/2004 | Boucher et al. |
| 2004/0236620 | A1 | 11/2004 | Chauhan et al. |
| 2005/0023347 | A1 | 2/2005 | Wetzel et al. |
| 2005/0192999 | A1 | 9/2005 | Cook et al. |
| 2005/0222933 | A1 | 10/2005 | Wesby |
| 2005/0267898 | A1 | 12/2005 | Simon et al. |

FOREIGN PATENT DOCUMENTS

| | | |
|---|---|---|
| WO | WO-01/35366 | 5/2001 |

OTHER PUBLICATIONS

Mobile Collector 2.0 User's Guide, Itron, Inc., Spokane, WA, 2003, pp. i-84.

Mobile Collector 2.0 Administration Guide, Itron, Inc., Spokane, WA, 2003, pp. i-78.

BadgerMeter, Inc., "TRACE® Automated Meter Reading System, Vehicle Interactive Display (VID), Technical Brief," Milwaukee, WI, Jun. 2002, 1 page.

BadgerMeter, Inc., "TRACE® Automated Meter Reading System, Operation Brief," Milwaukee, WI, Dec. 2001, 2 pages.

BadgerMeter, Inc., "TRACE® Automated Meter Reading System, MODEL MMI Mini Mobile Interrogator, Technical Brief," Milwaukee, WI, Dec. 2001, 2 pages.

AMCO Automated Systems, LLC, "Vehicular Interactive Display (a Mini Mobile Interrogator option)," Scott Depot, WV, Sep. 2002, 2 pages.

AMCO Automated Systems, LLC, "TRACE Automated Meter Reading Systems, TRACE™ VRT™—mobile AMR system," Scott Depot, WV, Apr. 2003, 2 pages.

* cited by examiner

Mapping Symbology

-  — Single "unread" endpoint
-  — Group of "unread" endpoints
-  — Duplicate endpoint – Only display ONE of the duplicates
-  — Single "read" endpoint
-  — Group of "read" endpoints
-  — The vehicle with good GPS signal
-  — The vehicle without good GPS signal
-  — "Unread" out of route endpoint
-  — "Read" out of route endpoint

- Import – Use import to load route playback file (*.TRL – Traveled Route Locations). These files are located in the Mobile Collection Log directory.

MAPPING IN MOBILE DATA COLLECTION SYSTEMS, SUCH AS FOR UTILITY METER READING AND RELATED APPLICATIONS

CROSS REFERENCE TO RELATED APPLICATION

This application claims priority to commonly owned U.S. Provisional Patent Application No. 60/592,053, also entitled "Mapping in Mobile Data Collection Systems, Such as for Utility Meter Reading and Related Applications," filed Jul. 28, 2004, which is herein incorporated by reference.

BACKGROUND

Utility companies typically rely on meter reading to determine consumption of a utility by its customers. In some utility meter reading applications, operators drive vehicles equipped with radio-equipped data collection units around an area or route to read electric, gas, and/or water meters. The meters are equipped with modules that allow them to send and receive signals. This style of meter reading, sometimes referred to as mobile automatic meter reading (MAMR), allows meter reading to be completed without direct access to the meter.

MAMR is sometimes used in saturated areas where there may be large populations of meters, difficult-to-access meters, or hazardous-to-read meters.

When used in such areas, MAMR can dramatically improve meter reading efficiency. For example, a single data command unit transceiver reads an average of 10,000-12,000 meters in an eight-hour shift, and can read up to 24,000 meters per day, depending on meter density and system use.

Routes for MAMR are typically defined geographically and may include hundreds or thousands of meters. The meters on the route are read using one or more techniques. For example, with a wake-up technique, a MAMR vehicle moves through an area and sends wakeup signals to notify the meters in the area to send meter reading data. With a bubble-up technique, the MAMR vehicle simply picks up broadcasted signals from all meters in its vicinity. To determine the endpoints in a route, MAMR systems typically rely on route information provided by the utility. In some cases, the route information includes a list that identifies each meter using a unique meter ID and address assigned to the meter. The route information is typically formulated in advance of driving the route, and is often based on the geographic location of each meter relative to other meters in the route. For example, a MAMR route may have starting and ending points, and meters are read according to proximity from a vehicle moving between the starting and ending points.

Routes consisting of lists of meter addresses are typically provided in advance of MAMR activities. Because of this, and because of many other reasons, route planners, MAMR operators, utilities, and their customers could benefit from improvements in monitoring and mapping capabilities in MAMR systems.

Figure 1:
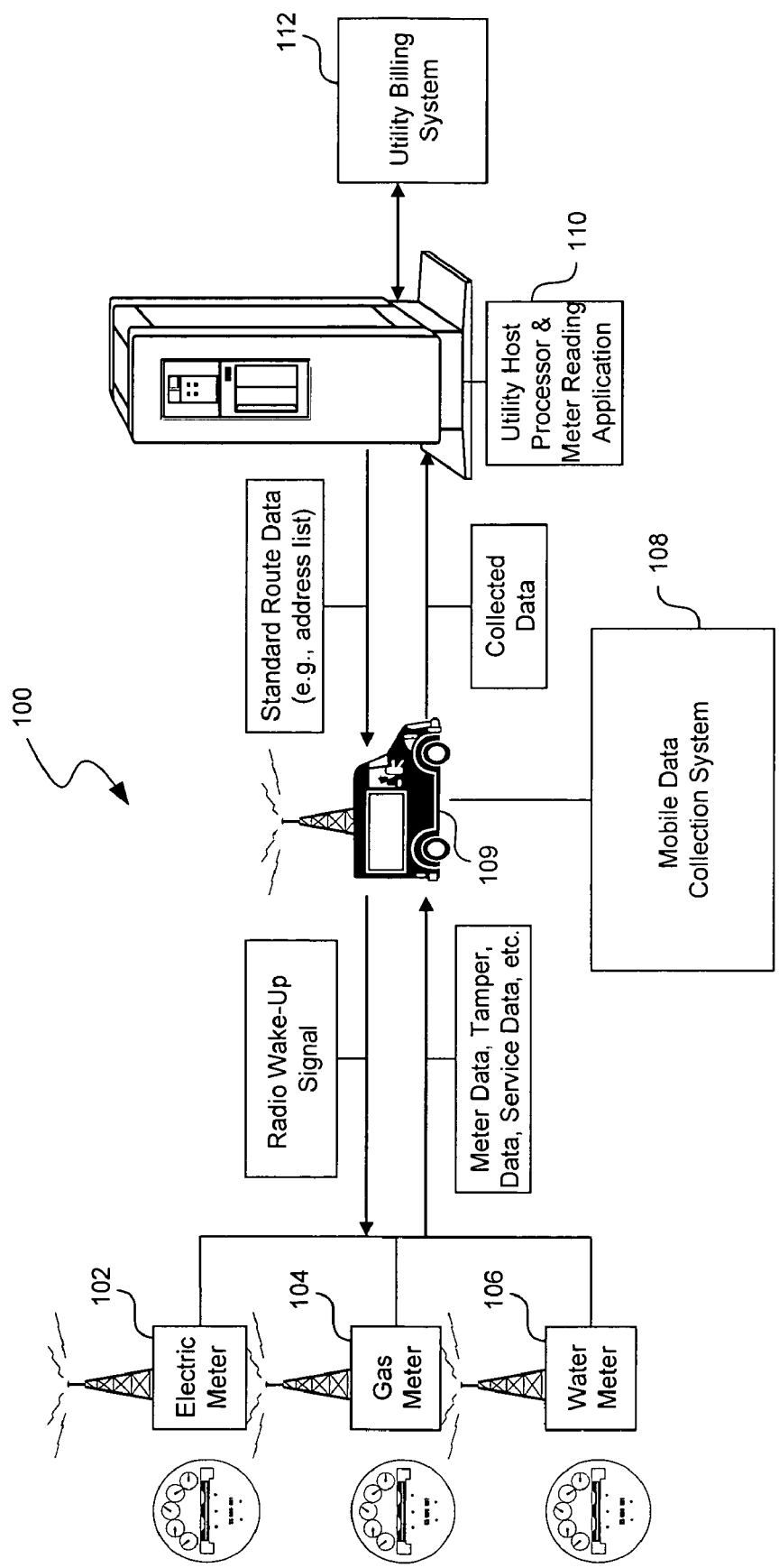
FIG. 1 is a block diagram showing an example of a system for performing mobile collection of meter reading data, including identifying out of route meters and facilitating playback of graphical route information under one embodiment.

In the drawings, the same reference numbers identify identical or substantially similar elements or acts. To facilitate the discussion of any particular element or act, the most significant digit or digits in a reference number refer to the figure number in which that element is first introduced (e.g., element 204 is first introduced and discussed with respect to FIG. 2).

A portion of this disclosure contains material to which a claim for copyright is made. The copyright owner has no objection to the facsimile reproduction by anyone of the patent document or patent disclosure (including Figures), as it appears in the Patent and Trademark Office patent file or records, but reserves all other copyright rights whatsoever.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention.

Certain terms may even be emphasized below; however, any terminology intended to be interpreted in any restricted manner will be overtly and specifically defined as such in this Detailed Description section.

I. Overview

The method and system described herein allows for monitoring and management of mobile automatic meter reading (MAMR) activities via out of route meter read identification and graphical route playback. In some embodiments, some of the monitoring and management activities occur at a mobile data collection system. The mobile data collection system may include a combination of components (including both hardware and software) that generally facilitate the collection of meter data from utility meters (e.g., electric, gas, water, etc.) and the graphical display of meter routes in progress via the use of maps or other features.

In some embodiments, the mobile data collection system may be configured to identify and record information relating to out of route meters (e.g., meters not associated with a route presently known by the mobile data collection system). Such meters (or "endpoints") may be unexpectedly, inadvertently, unintentionally, or otherwise, encountered during a meter reading route. In the event of an out of route endpoint, the mobile data collection system may alert an operator of the mobile data collection system. For example, the mobile data collection system may display information relating to each of the out of route endpoints on the route and/or may provide an audible alert when such a meter is encountered.

Information relating to the reading of out of route endpoints on the route may include the physical location of each of the encountered out of route endpoints and the physical location of the vehicle at the time the endpoint was read. The same information may be provided for in route endpoints. The mobile data collection system may provide this information to the operator using a map and/or in another formats, such as in text on a list or other display. While driving the route, the operator may use the information relating to the out of route endpoints to make decisions about how to drive the route. In some embodiments, the mobile data collection system may automatically determine an optimized driving path for the operator based on the collected out of route endpoint information. The automatic determination of an optimized driving path may be based on mathematical computations and algorithms applied to the collected information, including information about the route, the vehicle, the endpoints, etc.

In addition, the mobile data collection system may provide information relating to the out of route endpoints to a host processing system, or any other system configured for further processing of the information. The utility service provider may then use this information to reconfigure or optimize meter reading routes and to otherwise increase the efficiency of the mobile collection system. For example, the information related to out of route meters may be used to automatically determine which endpoints to include within predetermined routes, thus reducing the number of out of route endpoints encountered on each route. Information about out of route endpoints may also be of use when a utility is managing the billing of off cycle reads, which are often associated with customers that are moving.

The mobile data collection system may also log route data so that it can be played back after the route is completed. For example, the mobile data collection system may provide a map showing the path that the vehicle took during the route, the order that the meters were read, the timing of the route, etc. The type of information displayed on the map may include the location of the vehicles, the reading of meters or groups of meters, the identification of in route and out of route meters, etc. This information may be used for almost any purpose, including training, supervision of employees, improving route efficiency, assisting contractors or substitute meter readers, route optimization, etc.

II. Representative System

FIG. 1 and the following discussion provide a brief, general description of a suitable environment in which the invention can be implemented. Although not required, aspects of the invention are described in the general context of computer-executable instructions, such as routines executed by a general-purpose computer (e.g., a server computer, wireless device, or personal/laptop computer). Those skilled in the relevant art will appreciate that the invention can be practiced with other communications, data processing, or computer system configurations, including Internet appliances, hand-held devices (including personal digital assistants (PDAs)), wearable computers, all manner of cellular or mobile phones, embedded computers (including those coupled to vehicles), multi-processor systems, microprocessor-based or programmable consumer electronics, set-top boxes, network PCs, mini-computers, mainframe computers, and the like. Indeed, the terms "computer," "host," and "host computer" are generally used interchangeably and refer to any of the above devices and systems, as well as any data processor.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communication network. In a distributed computing environment, program modules may be located in both local and remote memory storage devices.

Aspects of the invention may be stored or distributed on computer-readable media, including magnetically or optically readable computer disks, as microcode on semiconductor memory, nanotechnology memory, organic or optical memory, or other portable data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or may be provided on any analog or digital network (packet switched, circuit switched, or other scheme). Those skilled in the relevant art will recognize that portions of the invention reside on a server computer, while corresponding portions reside on a client computer, such as a mobile device.

Referring to FIG. 1, a MAMR system 100 on which the out of route meter read identification and graphical route playback can be implemented provides various networked components. The system 100 is an example of one arrangement of elements, but others are possible. The system 100 includes a collection of utility meters (102, 104, and 106). The utility meters may be of the same or different types (e.g., electric 102, gas 104, water 106, or other (not shown)). The utility meters (102, 104, and 106) may be distributed in a bounded or unbounded geographical area. Each utility meter (102, 104, or 106) is connected to or associated with a utility consuming facility (not shown). For example, a utility meter may correspond with a household, a commercial facility, or another utility consuming facility or device.

While not illustrated in detail, each meter (102, 104, or 106) includes a storage component (not shown) for storing collected data before transmission to a data collection system. The storage component may also store information identifying the meter, such as a meter address. In addition, each meter may be configured with a receiver/transmitter telemetry device (e.g., ERT) capable of sending and receiving signals to and from a mobile data collection system 108. In general, these components (meter, storage, and telemetry device) may be collectively referred to as an "endpoint." However, the term "endpoint" may herein refer to any one of a number of possible configurations for locally collecting data, such as utility consumption data, and not only the sample configuration described above.

In some embodiments, the mobile data collection system 108 may send a wake-up signal to an endpoint. The received wake-up signal prompts the endpoint to transmit meter reading data to the mobile data collection system 108. In alternative embodiments, "bubble-up" (broadcast) techniques may be used instead of the "wake-up" technique described above. In yet other embodiments, the mobile data collection system 108 may be capable of point-to-point communications with specific endpoints.

To facilitate MAMR or similar techniques, the mobile data collection system 108 may be installed in a vehicle 109 or be otherwise configured to be transported through a route. For example, the vehicle may include the appropriate antennas, power cables, mounts, etc.

The system 100 also includes a host processing system and meter reading application(s) 110 for processing collected meter reading data. The host processing system and meter reading application(s) 110 may be operating in association with systems operated by a utility company, such as a utility billing system 112 or, more generally, a customer information system (CIS). In this way, the host processing system and meter reading application 110 can also be used to communicate data to the data collection system 108. This information may include standard route data. In general, the meter reading application uses customer information downloaded, for example, to create a route file used when driving the route to collect meter data. The collected data is returned to the meter reading application for processing. Examples of meter reading applications may include MV-RS™, Premierplus4™, Viena™, and Integrator™, all by Itron, Inc. of Spokane, Wash.

Figure 2:
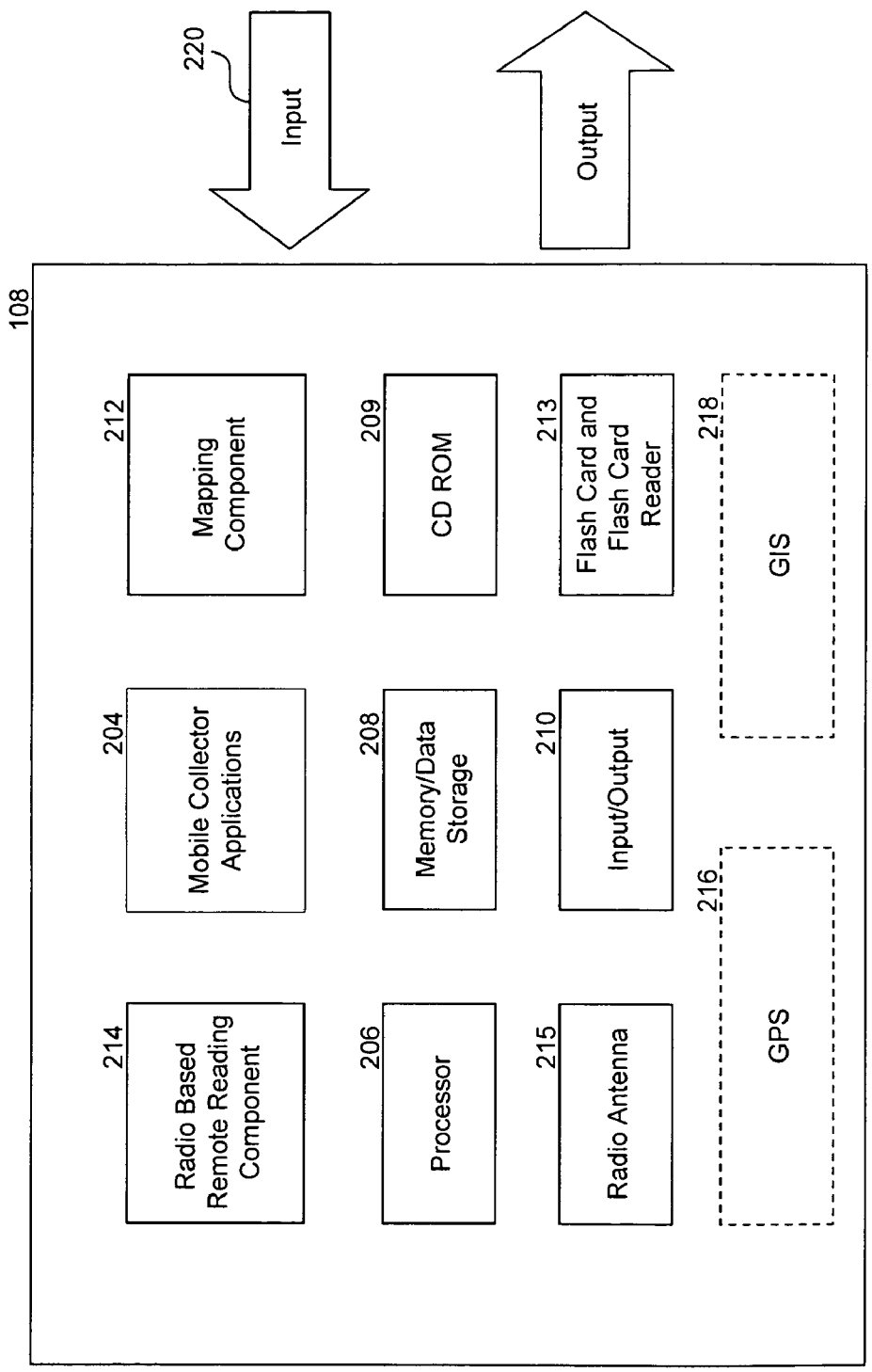
FIG. 2 is a block diagram showing an example implementation of the mobile data collection system of FIG. 1.

Referring to FIG. 2, the mobile data collection system 108 of FIG. 1 is shown in more detail. A mobile collector applications component 204 maintains route-related meter reading statistics, provides operating status information, and stores, processes, formats, and displays collected data. It may also include administrative functionality that administrative users can use to control preferences and settings of the data collection system.

A processor 206 and memory or other data storage 208 provide capabilities to control several processes, including management of collected meter reading data and processing of input for purposes of determining an efficient route for meter reading. For example, the memory 208 can store not only collected meter data, but also route and other information. A CD ROM 209 may handle removable media in the mobile data collection system 108. A user input/output component 210 provides an appropriate user interface for an operator of the data collection system 108. For example, the mobile data collection system 108 may provide a color touch screen display for ease of use and clear graphical mapping displays. Other user input/output options may be used including mouses, microphones, speakers, joysticks, keyboards, LCD screens, audio, etc.

One application of the input/output component 210 includes displaying and controlling mapping images generated by a mapping component 212. In this way, the operator is provided with feedback, so that he or she can determine which meter readings have been completed on a particular route and so he or she can view meters on the route in relation to the vehicle and to other meters. The mapping component 212 may interface with the mobile collector applications component 204.

Any one of the components described above may be contained on notebook computer or other device that can be easily removed from the vehicle when not in use, such as the Itronix GoBook MAX™.

In some embodiments, route data may be transferred to and from the mobile data collection system 108 using a removable flash card 213. For example, an operating system (not shown) associated with the mobile data collection system 108 may recognize the flash card 213 as a removable drive, allowing standard file access. In other embodiments, the routes may be transferred to the mobile data collection system via a local area network (LAN), a wide area network (WAN), etc. Periodic data backups to the flash card can be configured in the mobile collector applications component 204.

The mobile data collection system 108 also includes a radio based remote reading component 214, which, in some embodiments, may include a transceiver. The radio based remote reading component 114 may, via a radio antenna 215, send signals to wake-up meters that function in "wake-up" mode and to receive and manage incoming data. The mobile data collection system 108 may also include a Global Positioning System (GPS) component 216, a Global Information Services (GIS) component 218, or like systems, which may be used to facilitate mapping and other related functionality, such as route playback features.

In general, GPS uses a network of satellites that continuously transmit coded information that makes it possible to precisely triangulate locations on earth by measuring the distance from satellites. GPS signals broadcast line of sight, meaning that the signals will pass through clouds, glass, and plastic but will not pass through most solid objects, including people, buildings, and mountains. The GPS receiver provides increased accuracy of positioning data as the number of accessible satellites increases. Accordingly, aspects of the mapping component can be configured to inform the operator of the number of satellites available.

Where the GPS component 216 (or GIS component 218) is implemented, operators of the mobile data collection system 108 can use latitude and longitude coordinates to locate endpoints in the field and to track the progress of the mobile collection vehicle while driving the route. This information may also be used in implementing a playback feature, which is described in more detail below with respect to FIGS. 9-12. In some embodiments, the GPS component 216 uses embedded mapping software to map the GPS coordinates in any given area (including geography, roads, landmarks, etc.). In some embodiments, an endpoint location file (shown as input 220) provided to the mobile data collection system 108 provides information on endpoint locations.

III. User Interface

Various user screens, views, and other interfaces may allow users to monitor and manage meter reading route activities. Examples of such screens are described with respect to FIGS. 3-12. While only certain examples are given, a person skilled in the art will appreciate that many other interfaces could be implemented without departing from the scope of the invention. The terms "view," "screen," "window," and "page" are generally used interchangeably herein. The pages described herein may be implemented using, for example, WML (wireless markup language), XHTML (extensible hypertext markup language), XML (extensible markup language), or HTML (hypertext markup language). In some embodiments, WML and XHTML decks offer similar functionality but may differ with respect to style guide and design requirements between the two languages (use of color, icons, etc.).

In some cases, the screens or pages provide facilities to receive input data, such as a form with fields to be filled in, pull-down menus or entries allowing one or more of several options to be selected, buttons, sliders, hypertext links, or other known user interface tools for receiving user input. While certain ways of displaying information to users are shown and described with respect to certain Figures, those skilled in the relevant art will recognize that various other alternatives may be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other) where the layout and information or content to be displayed on the page are stored in memory, database, or other storage facility.

When implemented as web pages or wireless content, the screens are stored as display descriptions, graphical user interfaces, or other methods of depicting information on a computer screen (e.g., commands, links, fonts, colors, layout, sizes and relative positions, and the like), where the layout and information or content to be displayed on the page are stored in a database. In general, a "link" refers to any resource locator identifying a resource on a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the invention are described herein using a networked environment, some or all features may be implemented within a single-computer environment.

In general, for ease in describing features of the invention, aspects of the invention will now be described in terms of a user (e.g., a mobile data collection system operator) interacting with the mobile data collection system.

A. System Performance Monitoring

Figure 3:
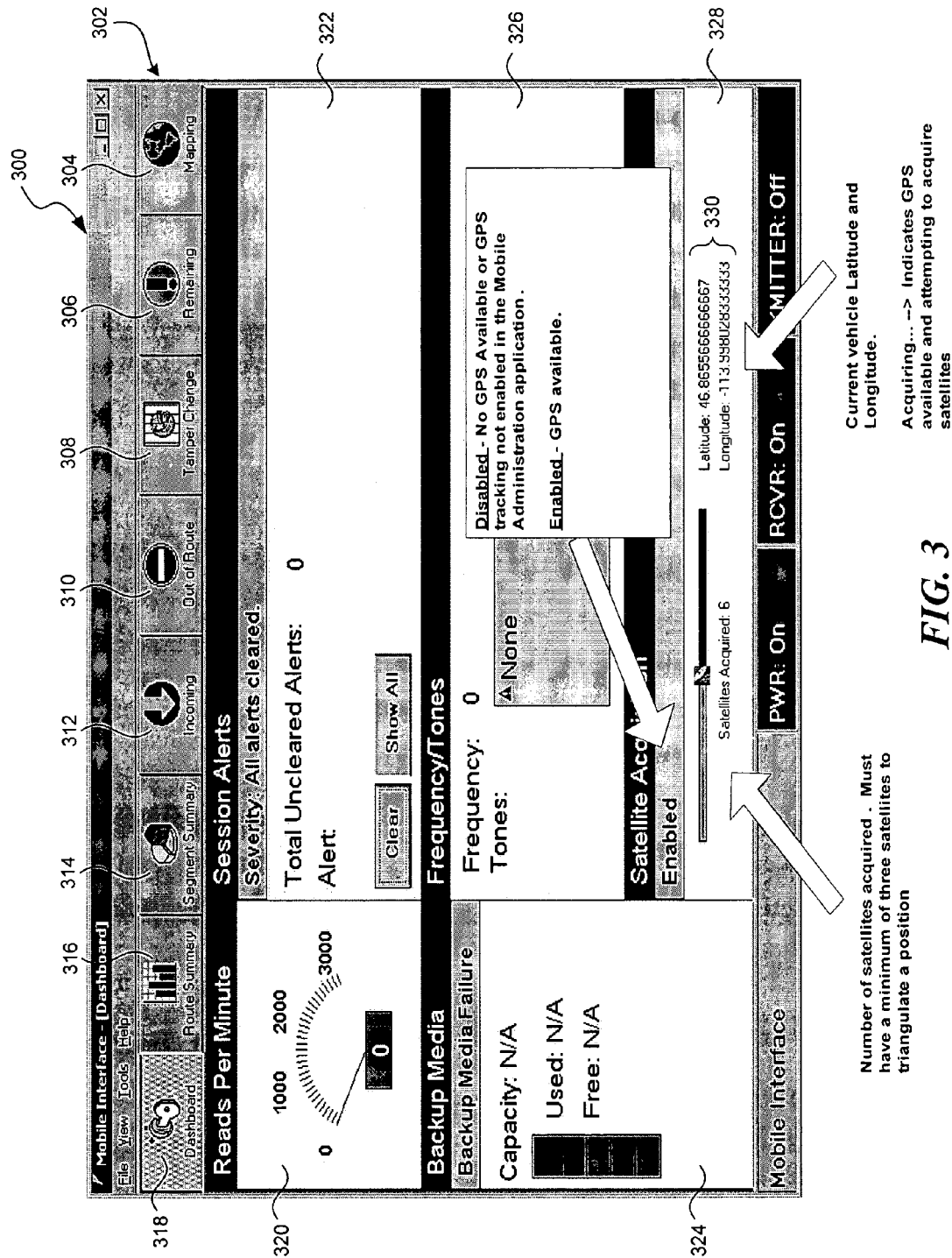
FIG. 3 is a display diagram showing a dashboard view associated with the mobile data collection system of FIGS. 1 and 2.

Referring to FIG. 3, a dashboard view 300 allows a user to monitor current (e.g., over the last minute) system performance while collecting meter reads. A view tool bar 302 provides access to other system functionality via a set of buttons. For example, a mapping button 304 provides access to mapping functionality that displays a graphic view of the route showing each endpoint or group of endpoints on a map of a meter reading area (described in detail with respect to FIGS. 4-7). A remaining button 306 may provide access to functionality that displays the endpoints that still need to be read in a route. A tamper change button 308 may provide access to functionality that displays collected reads that contain a change to their tamper status. An out of route button 310 may provide access to functionality that displays information about reads collected for endpoints that are not included in loaded route files (described in detail with respect to FIG. 8). An incoming button 312 may provide access to functionality that dynamically displays each new reading as the system collects it. A segment summary button 314 may provide access to functionality that monitors the progress of routes by segment including segment-specific messages. A route summary button 316 may provide access to functionality that displays a view of the routes that are currently loaded in the system, the total number of endpoints in the route, the percentage of endpoints that have been read already, and the primary and secondary status of the route. A dashboard button 318 provides access to the dashboard view 300 from other screens or views.

In the illustrated embodiment, the dashboard view 300 provides a continuously updated summary of data collection system performance. Performance indicators can include the number of reads per minute 320, error or alert messages 322, the amount of free space available on a backup disk 324, the frequency and tones that the system is transmitting to read meters 326, the number of satellites available to a mapping system 328, etc. In addition, the dashboard view 300 may provide an indication of a current GPS position 330 of the vehicle.

In the illustrated embodiment, the reads per minute feature 320 shows the total number of new in route and out of route reads collected within a given time frame (e.g., over the last 60 seconds) in a speedometer-like display that refreshes periodically (e.g., every 15 seconds). The session alerts feature 322 displays the total number of uncleared alerts that is in an audit log, as well as the most severe alert that is currently active. In some embodiments, a bar (not shown) below the session alerts feature displays a color-coded warning, depending on the severity of the highest priority alert. For example, red may indicate a critical alert that requires immediate action, while orange may notify of a temporary malfunction or loss of data and yellow may indicate a condition where no immediate action is needed.

In some embodiments, the dashboard view may be displayed alone, while in other embodiments, it may be displayed in addition to other screens or views, such as a route mapping view.

B. Route Mapping

Figure 4:
FIG. 4 is a display diagram showing mapping symbology associated with a mapping component of the mobile data collection system of FIGS. 1 and 2.
Figure 4:
Figure 4:
Figure 4:
Figure 4:
Figure 4:
Figure 4:
Figure 4:
Figure 4:

Referring to FIGS. 4-7, a user may monitor route reading progress using a mapping view 500. The mapping view 500 allows the user to see the vehicle's location and the changing status (e.g., unread, read, out of route, etc.) of route endpoints as travel over a route progresses. A mapping symbology key 400 is shown in FIG. 4, and provides sample symbols for a single unread endpoint (single red dot) 402, groups of unread endpoints (single red dot with white in the middle) 404, duplicate endpoints (red dot with white cross) 406, a single read endpoint (single green triangle) 408, groups of read endpoints (single green triangle with white in the middle) 410, a vehicle with a good GPS signal 412, and a vehicle without a good GPS signal 414. As illustrated, endpoints in close proximity are displayed as groups (404 and 410). Proximity for grouping varies depending on the zoom level of the map and, possibly, grouping settings.

Endpoints are duplicates 406 if the same endpoint ID exists more than once in the system, either in the same route file or in multiple routes. In the illustrated embodiment, if as few as one endpoint in the group is unread, the group is displayed as a group of unread endpoints.

The mapping symbology also includes symbols for unread out of route endpoints (blue rectangle) 416 and read out of route endpoints (blue rectangle with white in the middle) 418.

Figure 5:
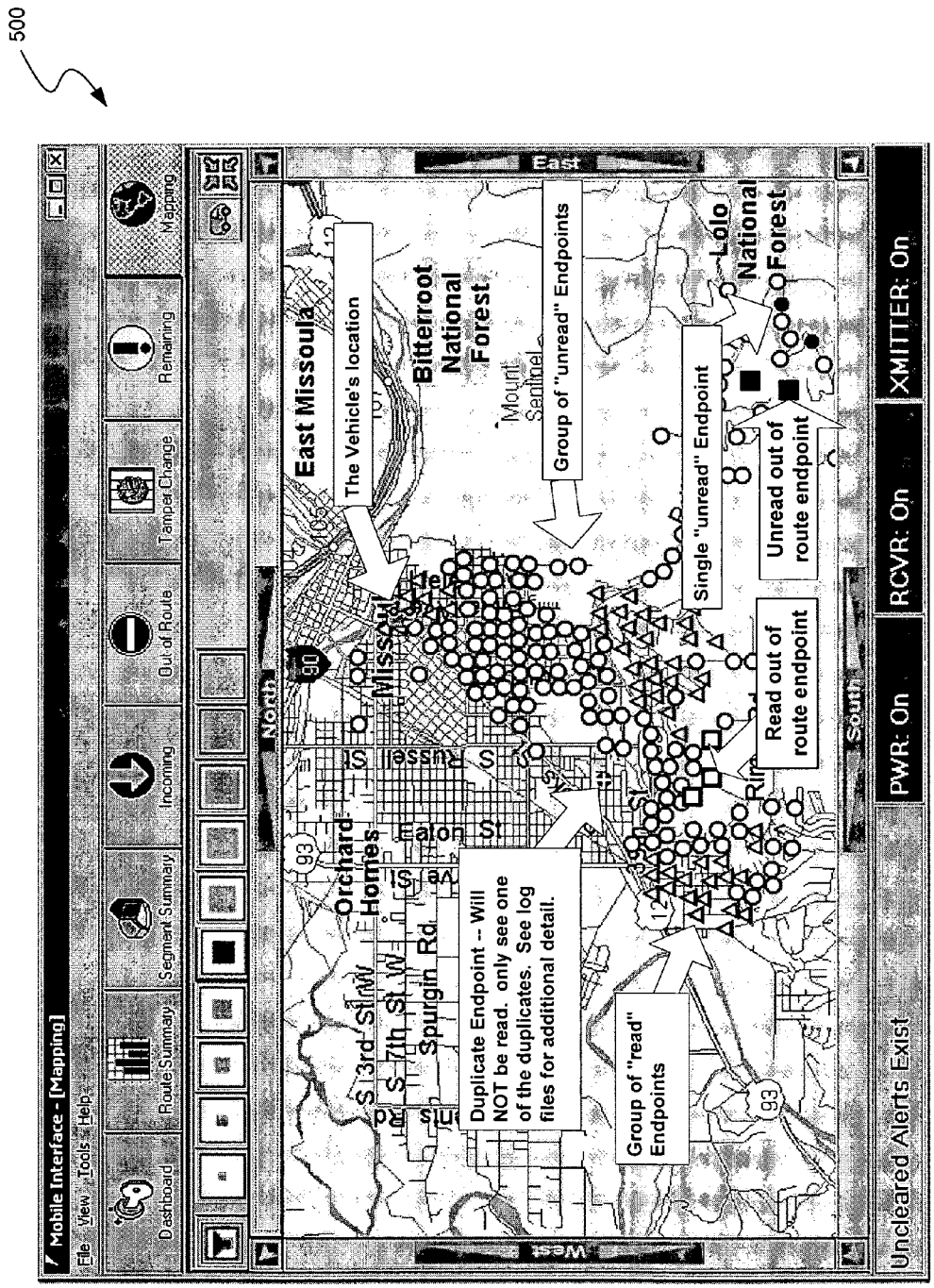
FIG. 5 is a display diagram showing mapped endpoints associated with the mapping component of the mobile data collection system of FIGS. 1 and 2.

FIG. 5 provides an example of a mapping view 500 showing an application of the symbology introduced in FIG. 4. For example, many different types of endpoints are shown, including single read endpoints, single unread endpoints, single groups of read endpoints, single groups of unread endpoints, and the vehicle. In the illustrated embodiment, the map is dynamic, meaning that it changes as the meter reading route progresses. For example, unread endpoints may change to read endpoints as readings occur, and new endpoints may appear on the map as they come into range. In addition, the mapping may provide information about the order or timing of a communication with an endpoint. For example, the most recent endpoints (e.g., most recently read) may appear in a bright resolution while the older endpoints (e.g., least recently read) may appear slightly faded.

Out of route endpoints also appear on the map, allowing the operator of the vehicle to make decisions on how to progress on the route (e.g., which street to turn on next). For example, if significant numbers of out of route endpoints are appearing on the map, this signals to the driver that he or she is nearing the edge or border of a route, and may need to change course.

In some embodiments, the map may be interactive by allowing users to drill down on specific endpoints. For example, clicking on or touching an out of route endpoint on the map may result in the display of specific information regarding the out of route endpoint, such as the specific information described with respect to FIG. 8.

Figure 6:
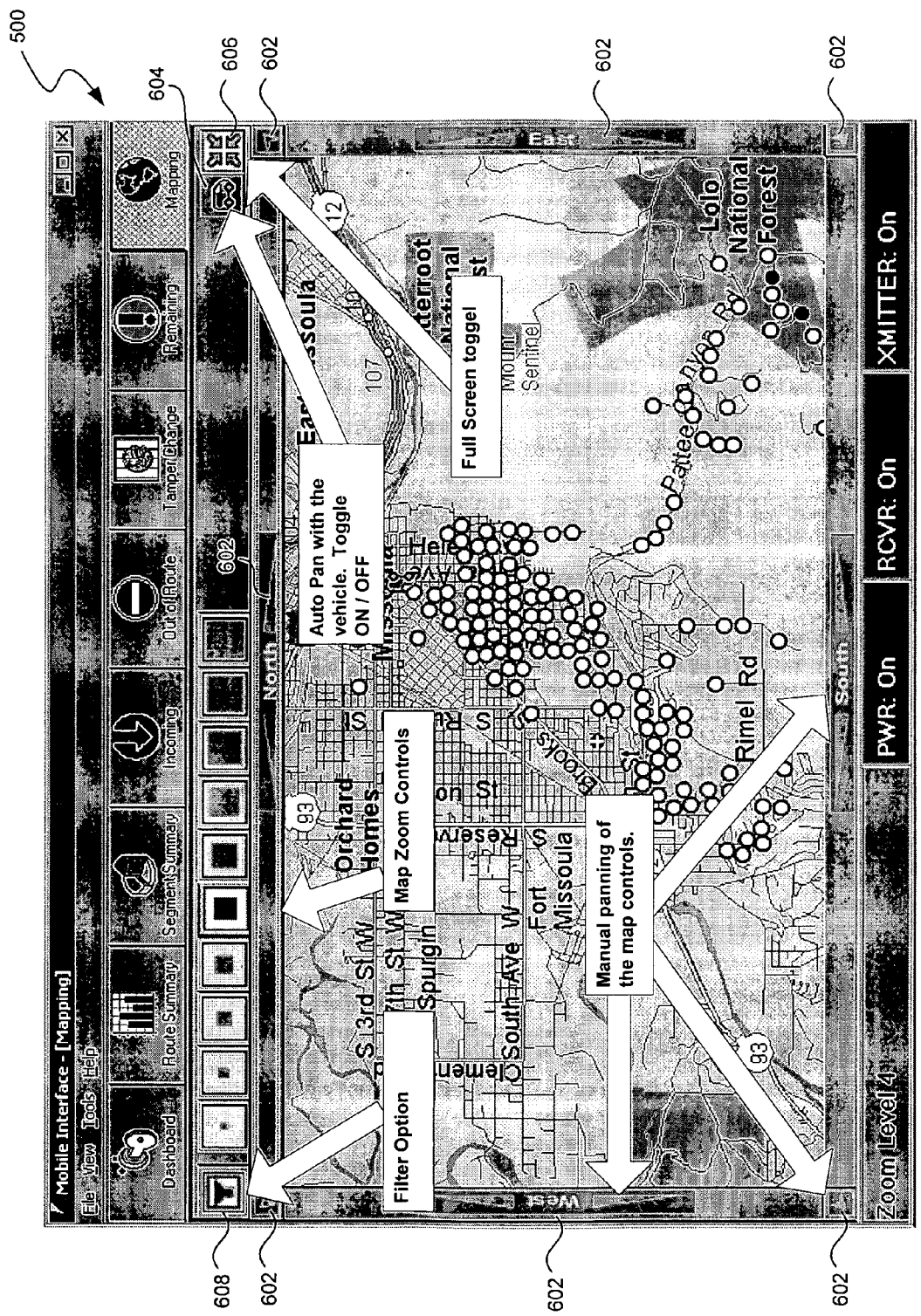
FIG. 6 is a display diagram showing a second map of endpoints associated with the mapping component of the mobile data collection system of FIGS. 1 and 2.

Referring to FIG. 6 the mapping view 500 may provide several ways to move around the map (e.g., up and down, side to side, diagonally, etc.). In some embodiments, the mapping feature uses software such as Microsoft's MapPoint 2004 engine, which provides maps for North America. However, many other implementations are possible. Navigation controls 602 on the top, bottom, sides, and corners of the map allow the user to move the map up, down, side to side, and diagonally. In some embodiments, an auto pan feature may be available, which enables moving of the map as the vehicle moves. The auto pan feature may be selected using an auto pan button 604. A full map screen button 606 may be used to toggle between a full screen view and a navigation mode. In some embodiments, a map filtering may be used to view map data that matches given search criteria. The map filtering may be accessed from a filter option button 608.

Figure 7:
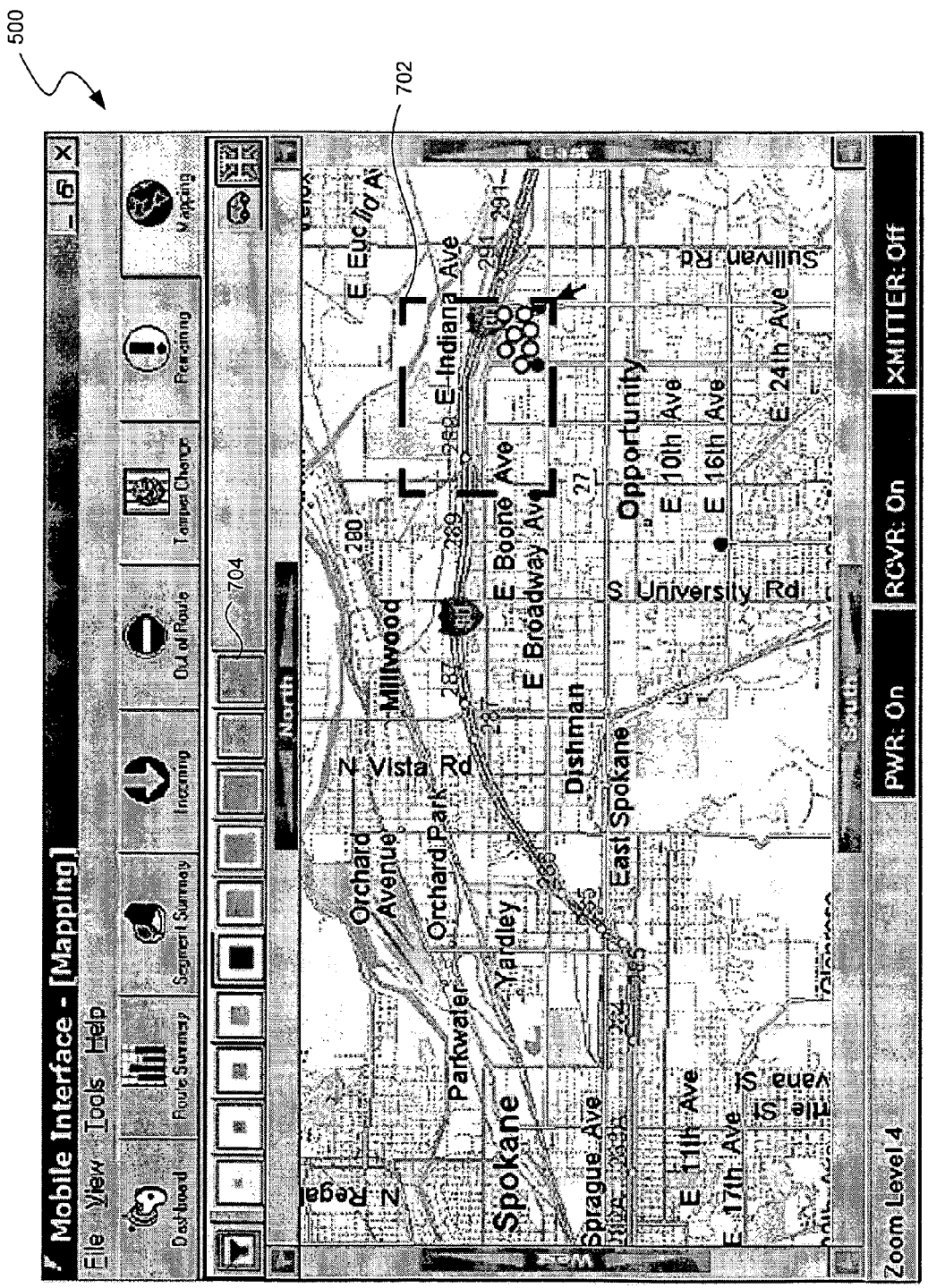
FIG. 7 is a display diagram showing map and zooming features associated with the mapping component of the mobile data collection system of FIGS. 1 and 2.

Referring to FIG. 7, the mapping functionality may also provide for zooming capability so that users can change the altitude or detail level of the map. In some embodiments, a user zooms in a selected portion of the map by dragging an adjustable size box 702 around the map display to a selected area. In the illustrated embodiment, the size of the box (selected area) determines the zoom level. Other techniques for zooming in and out may be used, such as a zoom size toolbar 704.

In some embodiments, the mapping functionality described herein may be combined with other functionality including voice enhancements, layering of maps to portray varying levels of detail (e.g., utility infrastructure vs. meters), or varying meter types (e.g., gas vs. electric vs. water), etc. Many combinations and features are possible.

C. Out of Route Meters

Figure 8:
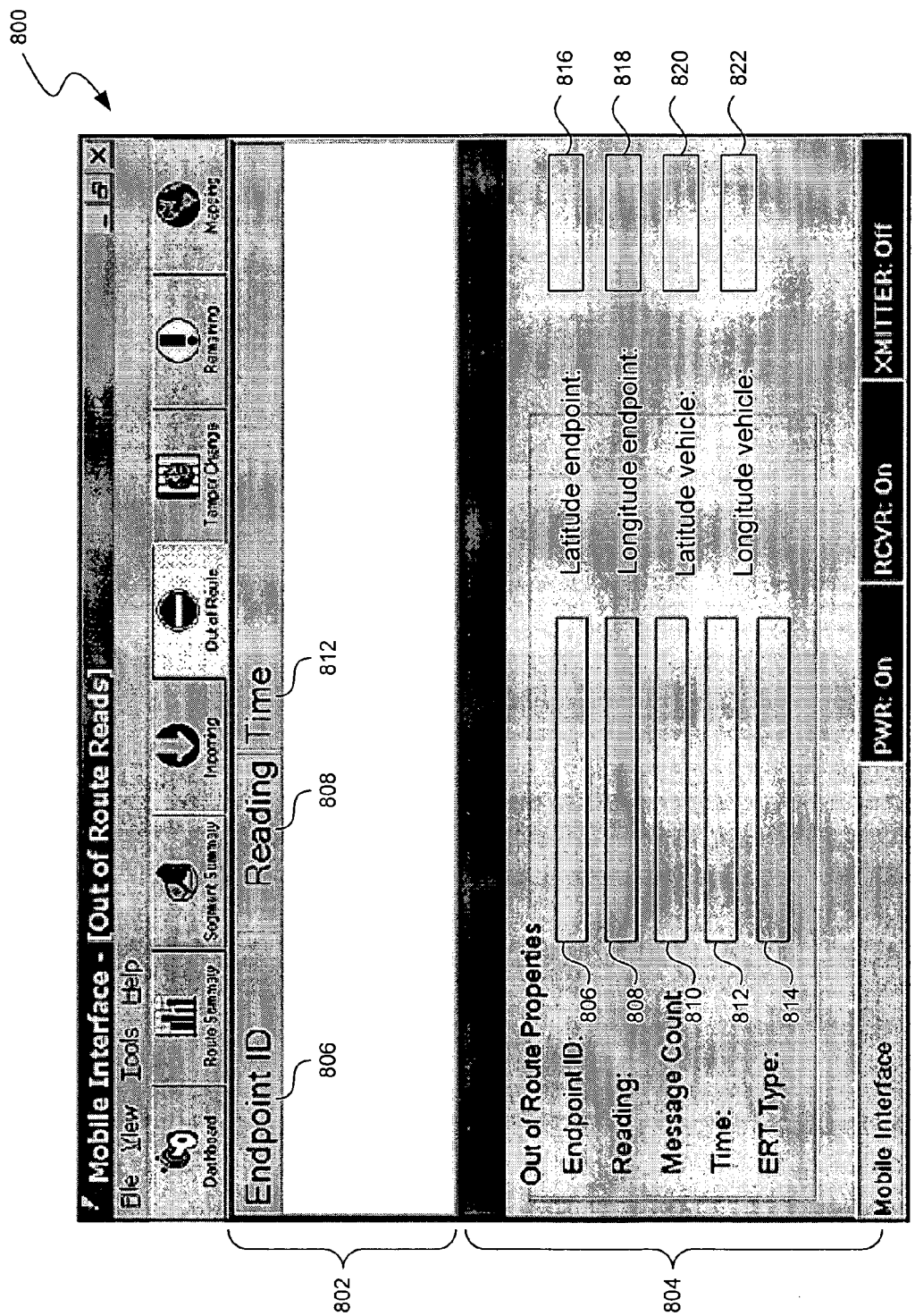
FIG. 8 is a display diagram showing an out of route view associated with the mobile data collection system of FIGS. 1 and 2.

Referring to FIG. 8, an out of route 800 view may include a static display that shows collected reads that do not belong to any of the routes currently loaded in the mobile collection system database. By providing information about out of route endpoints, routes can be reconfigured and updated on an ongoing basis to improve efficiency. For example, if there is a new house on a route that results in an out of route read when the driver passes through the area using the mobile collection system, the mobile data collection system can provide this information to the utility, so that it can be used to modify the route. In general, the out of route view 800 provides a visual graphical display that tells the driver when the system is performing an out of route meter read.

In some embodiments, the out of route view 800 may use information contained in the route file received from the utility or other source. In some embodiments, the mobile data collector captures the vehicle's location at the time the out of route endpoint was read, while any processing of the data may be performed remotely (e.g., at the host processor of FIG. 1). Information regarding out of route reads may be stored at the remote processing location for a period of time so that the utility can query a history of reads and avoid having to conduct a reread after a corresponding route for the out of route meter is confirmed.

In some embodiments, the out of route view 800 includes a list portion 802 and a properties portion 804, so that users can compare multiple reads simultaneously (via the list portion 802) or focus on a single read (via the properties portion 804). A default sort order in the list portion 802 displays out of route reads by the time collected, beginning with the most recent and continuing in descending order. The out of route view 800 may show an endpoint ID 806, a latest endpoint reading for the endpoint 808 (e.g., kilowatt hours used), a message count for the endpoint 810 (e.g., the number of times the endpoint was heard at the time the reading was collected), a reading time 812, and an endpoint type 814 (e.g., ERT type), as reported by the endpoint.

The out of route view 800 may also provide information on the location of the out of route endpoint, and the location of the vehicle at the time it read the out of route endpoint. More specifically, the out of route view may provide endpoint latitude data 816, endpoint longitude data 818, vehicle latitude data 820, and vehicle longitude data 822. To facilitate the collection, storage, processing, and display of out of route endpoints, this information may be contained within one or more data structures. In addition, the data structures may include information used to facilitate the mapping the out of route endpoints (shown, for example, in FIG. 5) or presenting the out of route endpoints in a route playback feature (as described with respect to FIGS. 9-12.

Based on the information related to out of out endpoints, the mobile data collection system may automatically determine an optimized driving path for the operator of the vehicle to take. This may be implemented using various mathematical computations and/or algorithms associated with the route and the geographic locations of the out of route endpoints. After the route is completed, the mobile data collection system may provide stored information relating to the out of route endpoints to a host processing system, or other system, where the information may go through additional processing. The utility service provider may then use this information to reconfigure or optimize meter reading routes and to otherwise increase the efficiency of the mobile collection system. For example, the information related to out of route meters may be used to automatically determine which endpoints to include within predetermined routes, thus reducing the number of out of route endpoints encountered on each route.

Other aspects of the user interface for out of route endpoints includes optional alerts that alert the operator of out of route endpoints while a route is being driven. Examples of alert sounds include high beeps, low beeps, rings, bells, etc. In the illustrated embodiment, a series of beep configuration choices are available to the user by selection of a radio button.

While the illustrated examples show out of route endpoints in a MAMR system, one skilled in the art will recognize that similar techniques can be implemented in fixed network meter reading systems and other systems without departing from the scope of the invention. Fixed network meter reading systems may include wireless and or wire line transmission of meter reading data over large areas without the use of a vehicle or other localized collection techniques.

D. Route Playback

Referring to FIGS. 9-12, a route playback component allows a user (e.g., a supervisor) to replay a driver's route. More specifically, it allows the user to see exactly how the driver drove the route, which meters were read, the timing of meter reads, the order of meter reads, etc. In some embodiments, the routes may be made up of segments and the route playback component allows the user to view one segment of the route at a time. The route playback component can have many uses, including reviewing routes for driving efficiency, troubleshooting missing endpoints, monitoring route drivers, investigating the occurrence of out of route readings, training, creating new routes, etc.

Figure 9:
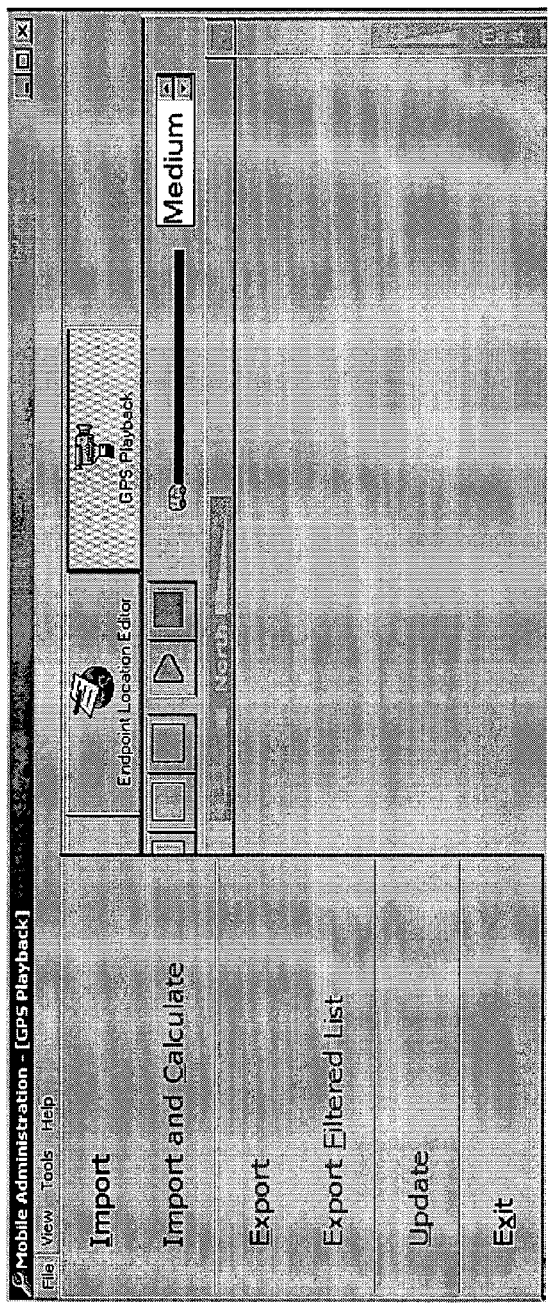
FIG. 9 is a display diagram showing importing a route file to be viewed in association with the route playback component of the mobile data collection system of FIGS. 1 and 2.

The route playback component may be implemented, in part, using a logging feature that tracks the progress of the vehicle as it drives a route. As shown in FIG. 9, the user can play back a route from a playback view by first importing a route file (e.g., .tlr) from a log directory.

Figure 10:
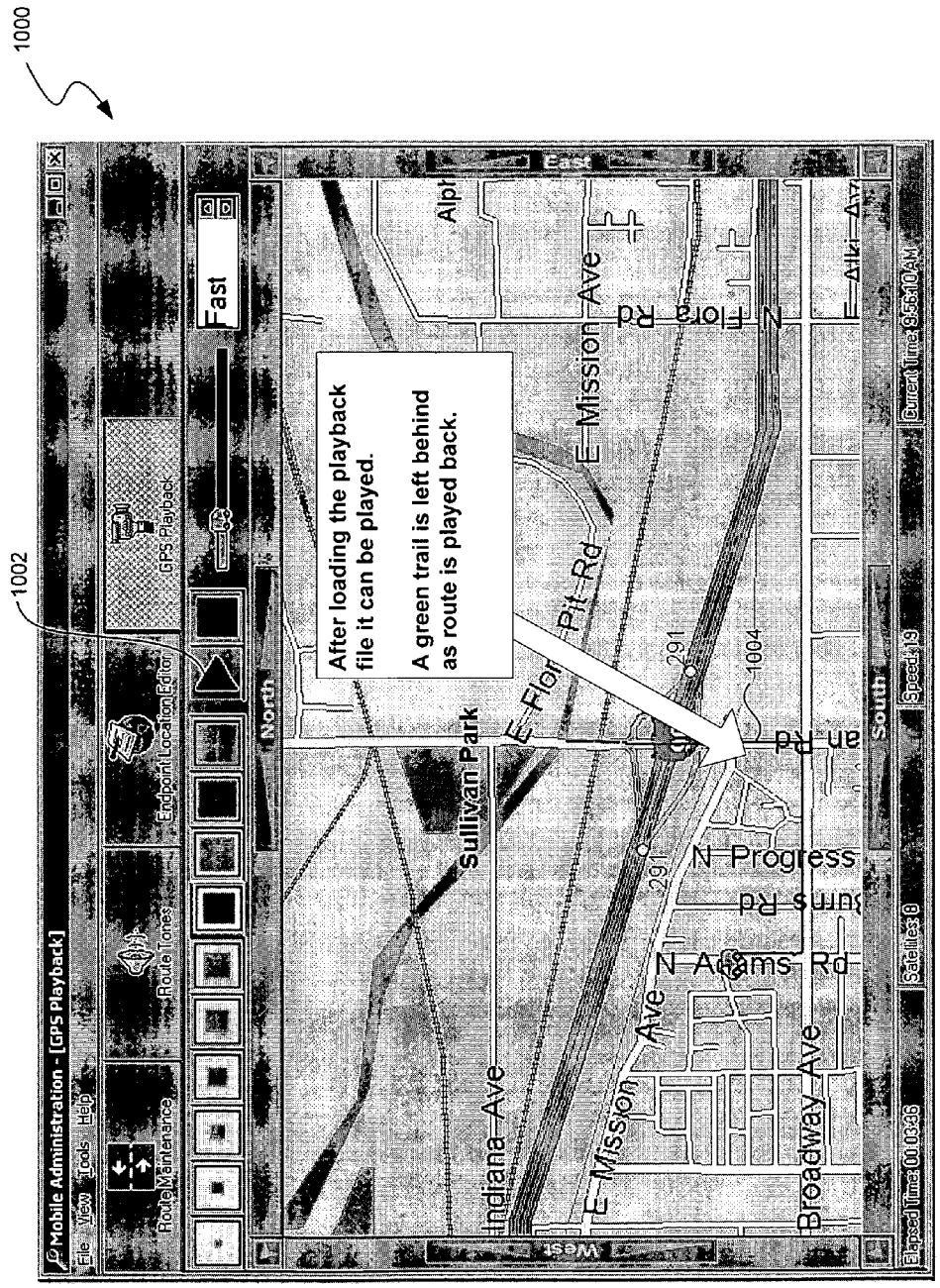
FIGS. 10 and 11 are display diagrams showing playback of a route in association with the route playback component of the mobile data collection system of FIGS. 1 and 2.
Figure 11:
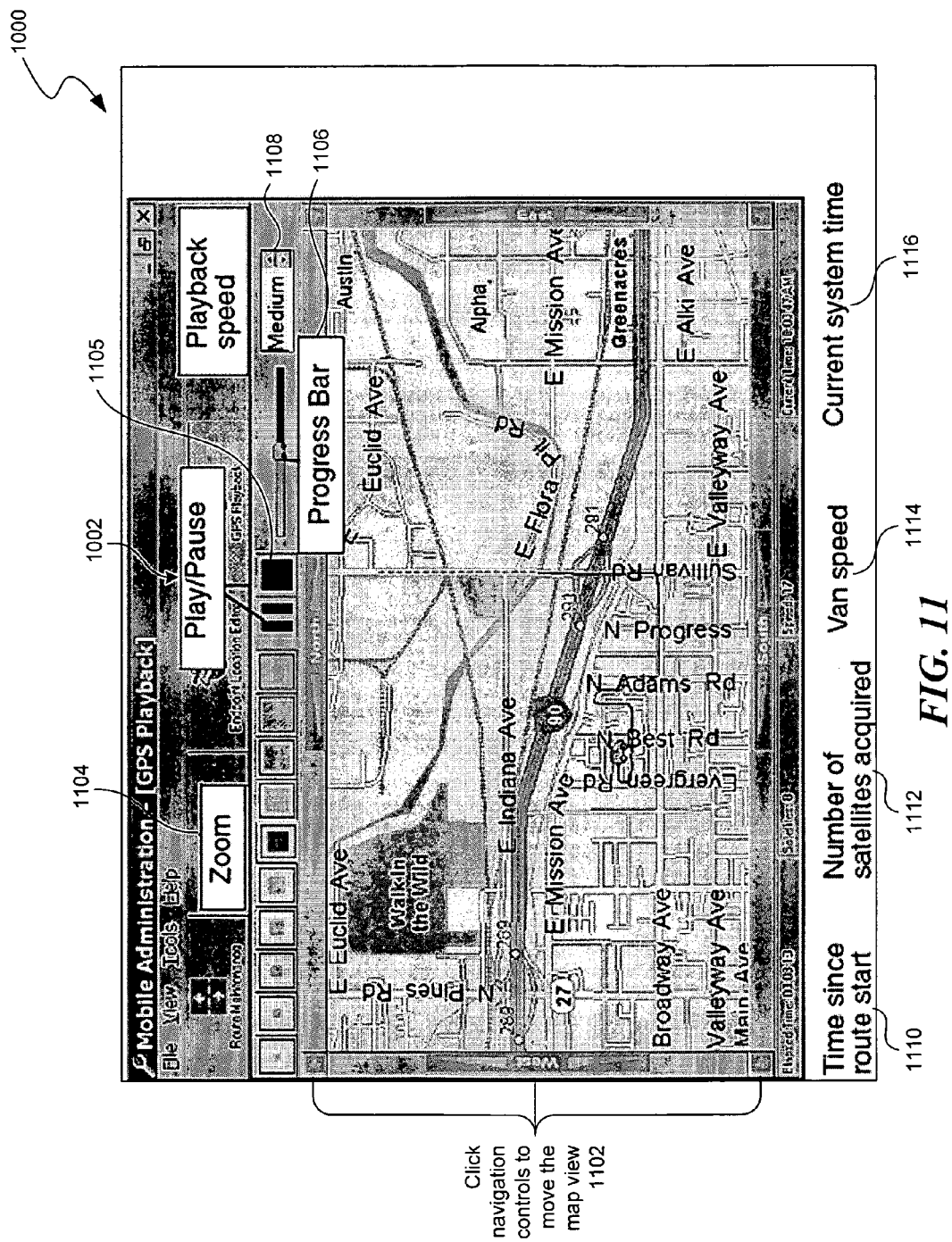

As shown in FIGS. 10 and 11, to start the playback in a corresponding playback view 1000, the user selects a play/pause button 1002, causing the route to play back, and showing the driving path as a colored line 1004. As with the mapping view of FIGS. 4-7, the user may use navigation controls 1102 to move the map up and down, side to side, and diagonally. The playback view 1000 may also have zoom features 1104. The user may pause the playback using the pause/play button 1002 or stop the playback using a stop button 1105. In addition, a progress bar 1106 shows the progress of the vehicle on the route. In some embodiments, the user may slide the vehicle icon progress bar 1106 to jump to a specific part of the route. In some embodiments, the playback speed can be adjusted to range from slow to fast using a playback speed adjustment bar 1108. Indicators of time since the route began 1110, number of satellites acquired 1112, vehicle/van speed 1114, and current system time 1116 may also be provided.

While not shown in detail in FIGS. 10 and 11, the playback may include showing graphical depictions of the various endpoints (both in route endpoints and possibly out of route endpoints) in the order and timing that the mobile data collection system read and acknowledged them. Examples of such graphical depictions are shown with respect to FIGS. 5-7. An example of the symbology used for such depictions is shown with respect to FIG. 4. However, other depictions are possible, including depictions that use color, sounds, fading, animation, etc.

In some embodiments, like the mapping features shown with respect to FIGS. 5-7, the user may be able to drill down for details of specific endpoints by selecting the pause/play button 1002, and then clicking or touching the endpoints shown on the screen.

Figure 12:
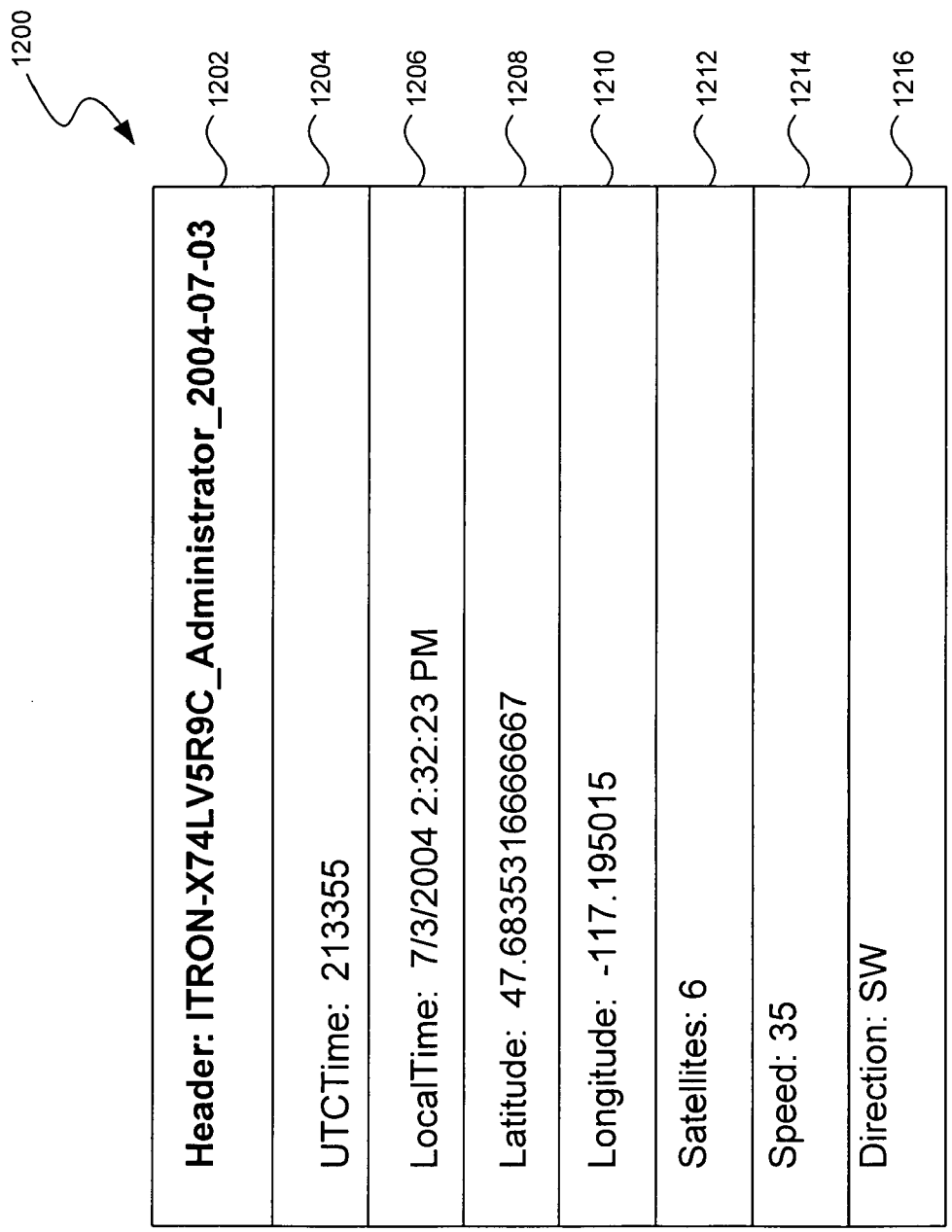
FIG. 12 is a block diagram showing an example of a data structure used in route playback.

Referring to FIG. 12, the information used to implement the route playback may be contained in a data structure 1200. In some embodiments, the data structure may include a header 1202 (e.g., ITRON-X74LV5R9C_Administrator_ 2003-07-03) that is comprised of the current user (e.g., Windows user) and the current date. The data structure 1200 may also include a UTCTime component 1204 (e.g., 213355), a LocalTime component 1206 (e.g., Jul. 3, 2004 2:32:23 PM), a Latitude component 1208 (e.g., 47.6835316666667), a Longitude component 1210 (e.g., −117.195015), a Satellites component 1212 that provides a number of available satellites (e.g., 6), a Speed component 1214 that provides the speed of the vehicle when taking the reading (e.g., 35), a Direction component 1216 that provides the direction of the vehicle when taking the reading (e.g., direction in terms of degrees), etc.

IV. System Flows

Figure 13:
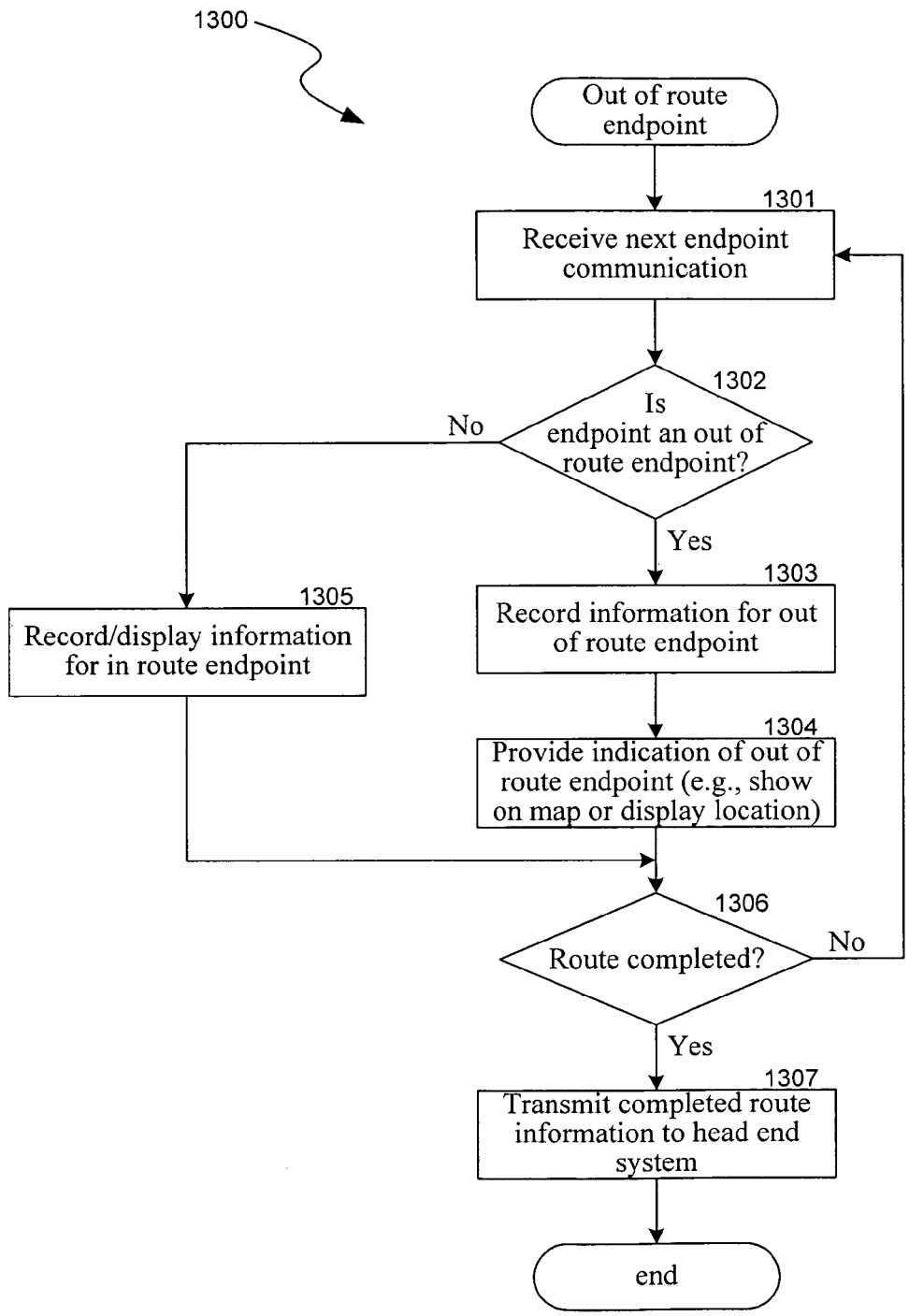
FIG. 13 is a flow chart showing an example of a routine for identifying and displaying out of route endpoints, which is performed at the mobile data collection system of FIGS. 1 and 2.
Figure 14:
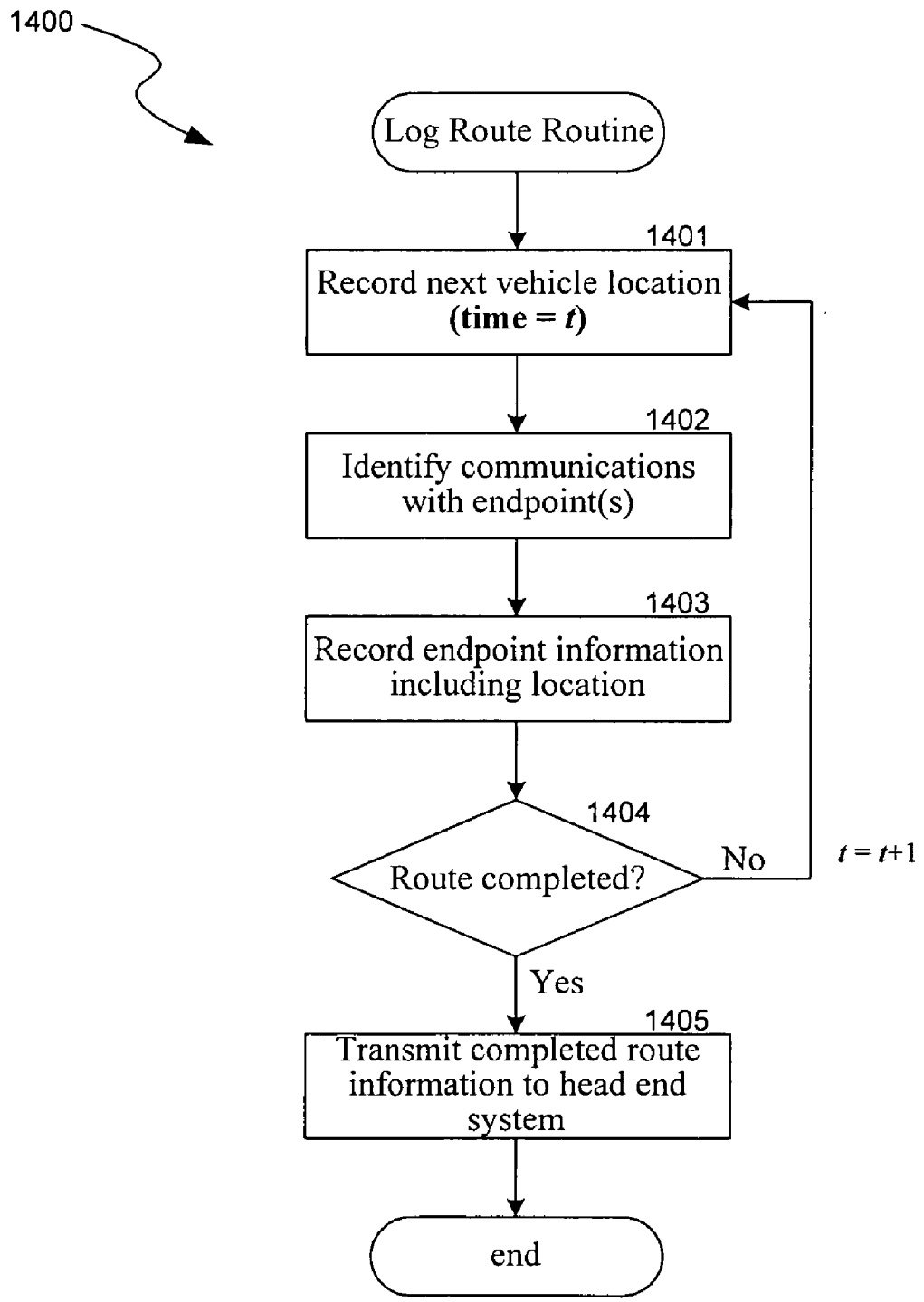
FIG. 14 is a flow chart showing a logging routine for a route playback performed at the mobile data collection system of FIGS. 1 and 2.
Figure 15:
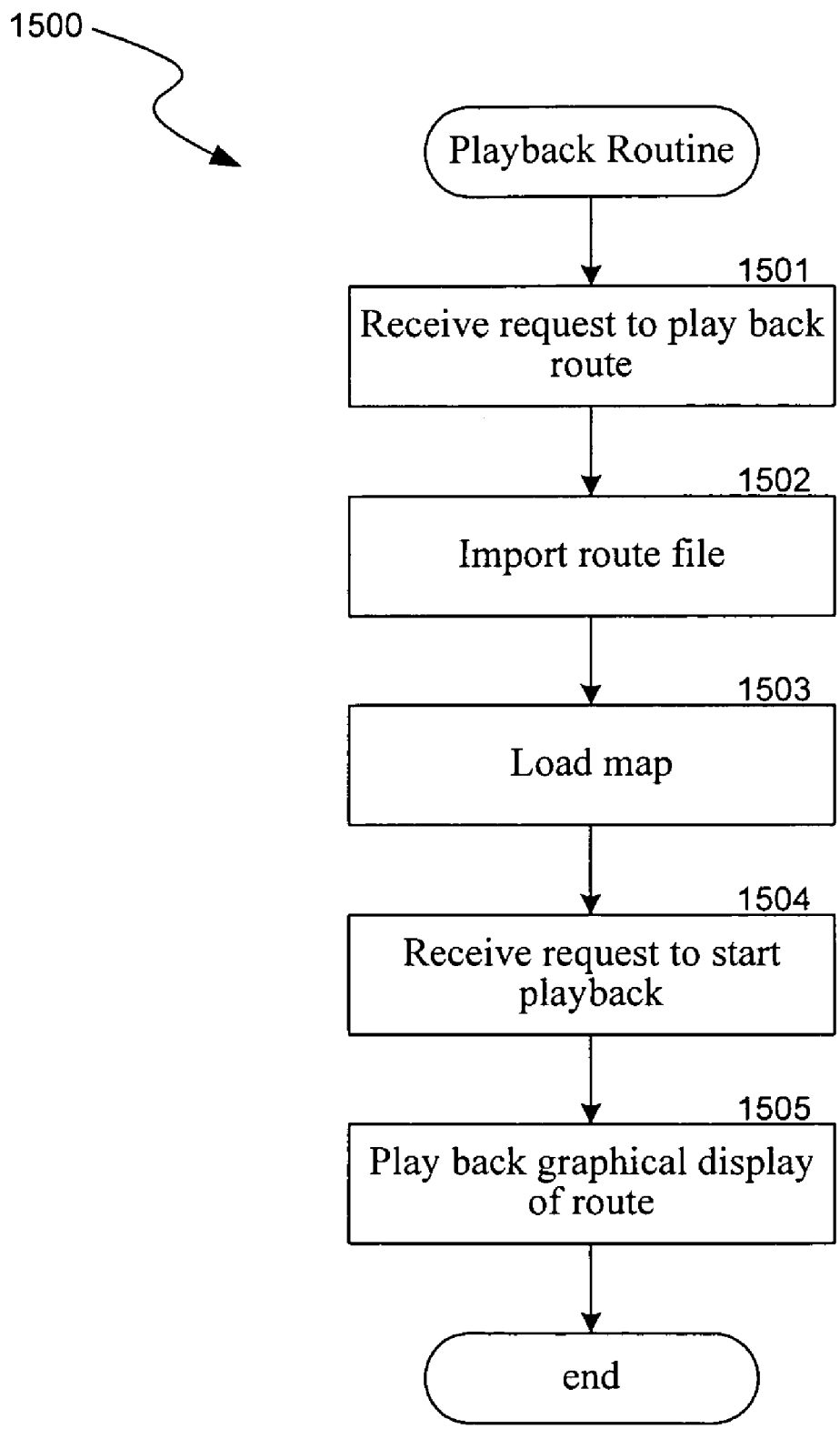
FIG. 15 is a flow chart showing a route playback routine.

FIGS. 13-15 are representative flow diagrams that show processes that occur within the system of FIG. 1. These flow diagrams do not show all functions or exchanges of data but, instead, provide an understanding of commands and data exchanged under the system. Those skilled in the relevant art will recognize that some functions or exchanges of commands and data may be repeated, varied, omitted, or supplemented, and other aspects not shown may be readily implemented. For example, while not described in detail, a message containing data may be transmitted through a message queue, over HTTP, etc.

Referring to FIG. 13, the mobile data collection system may perform a routine 1300 for identifying, collecting, and providing information about out of route endpoints encountered on a route. In some embodiments, the routine 1300 takes place while a MAMR route is being performed. In alternate embodiments, the routine 1300 takes place during data collection in a fixed network automatic meter reading system. At block 1301 the routine 1300 receives a next endpoint reading containing information associated with an endpoint. The endpoint information may include an identifier for the endpoint, meter reading data, meter tamper data, etc. The received endpoint information may also include information about the endpoint's location, including the endpoint's address or GPS coordinates. This information may be received within a single data structure or within a combination of data structures. In some embodiments, this information is known locally at the mobile data collection system and/or at a host processing system.

At decision block 1302, the routine 1300 determines whether the endpoint is an out of route endpoint (e.g., whether it is associated with the current route, whether it is associated with a route known by the mobile collection system, etc.). If at decision block 1302 the routine 1300 determines that the endpoint is not an out of route endpoint, the routine 1300 continues at block 1305, where the routine records and/or displays the information for an in route endpoint. If, however, at decision block 1302 the routine 1300 determines that the endpoint is an out of route endpoint, the routine continues at block 1303, where it records the received information for the out of route endpoint. In addition, the routine 1300 may record information about the location of the vehicle at the time the out of route endpoint was read. This information may be stored within a single data structure or within a combination of data structures.

At block 1304 the routine 1300 provides an indication of the out of route endpoint to the operator of the mobile data collection system. For example, the routine 1300 may show the out of route endpoint on a map, sound an alert when the out of route endpoint is read, add the out of route endpoint to a displayed list of out of route endpoints, or provide specific textual information for the out of route endpoint.

At block decision block 1306 the routine 1300 checks whether the route is completed (e.g., all meters on the route have been read). If the route is completed, the routine continues at block 1307, where the routine transmits completed route information to the host processing system. The routine 1300 then ends. If, however, at decision block 1306, the route is not completed, the routine 1300 loops back to block 1301 to receive the next endpoint reading.

Referring to FIG. 14, the mobile data collection system may perform a routine 1400 for logging route events for use with a graphical playback tool that shows a mapping of the vehicle traveling the route and the route's endpoints as the mobile data collection system establishes communication with such endpoints. At block 1401 the routine 1400 records the vehicle's location at a time t. At block 1402, the routine 1400 identifies communications with endpoints made between time t and a previous time (t−1). The identified communications may include receiving a wake-up signal response from an endpoint, reading an endpoint, etc. At block 1403 the routine 1400 records information associated with the identified communications. The recorded information may include information about the ID, location, status, and/or reading of each of the endpoints associated with the identified communications. This information may be recorded using a single data structure or a combination of data structures.

At decision block 1404 the routine 1400 checks whether the route is completed (e.g., all meters on the route have been read). If the route is completed, the routine 1400 continues at block 1405, where the routine transmits the recorded route information to the host processing system (e.g., in the form of a log file). The routine 1400 then ends. If, however, at decision block 1404, the route is not completed, the time t is set to equal (t+1) and the routine 1400 loops back to block 1401 to record the next vehicle location.

Referring to FIG. 15, a routine 1500 for playback of a graphical display showing a mobile data collection system performing a meter reading route may be performed at a device configured for displaying maps or similar information and for executing a log file containing route information. At block 1501, the routine 1500 receives a user request to execute a selected route file. At block 1502, the routine 1500 imports the selected route file. An example of this is shown with respect to FIG. 10. For example, the routine 1500 may import the selected route file from a host processing system. At block 1503, the routine 1500 loads a map associated with the selected route file. At block 1504, the routine 1500 receives a user request to start the route playback. For example, the user may select a play button to initiate the request. At block 1505, the routine 1500 plays back the graphical display on the route. An example of this is shown with respect to FIGS. 10 and 11. The routine 1500 then ends.

V. Conclusion

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Where the context permits, words in the above Detailed Description using the singular or plural number may also include the plural or singular number, respectively.

The teachings of the invention provided herein can be applied to other systems, not necessarily the system described herein. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the mobile data collection system may vary considerably in their implementation details, while still be encompassed by the invention disclosed herein. As noted above, particular terminology used when describing certain features or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. In a system for automatically collecting utility data from multiple utility meters, wherein each of the multiple utility meters includes at least a transmitter for transmitting meter data including associated utility consumption data, the system comprising:
   a mobile utility data collection system, wherein the mobile utility data collection system includes:
      at least one wireless receiver for wirelessly receiving meter data transmitted by at least some of the multiple utility meters, wherein at least some of the received meter data includes utility consumption data,
      at least one geographic positioning system for determining geographic positions of the mobile utility data collection system as the mobile utility data collection system travels along a current route,
      data storage for storing
         the received meter data,
         geographic position data associated with the determined geographic positions of the mobile utility data collection system as the mobile utility data collection system travels along the current route, and
         displayable information associated with a predetermined route, wherein the displayable information includes information regarding a set of the multiple utility meters in a predetermined route and utility meters not in the predetermined route,
      wherein the received meter data stored in the data storage includes meter data from the set of utility meters in the predetermined route and utility meters not in the predetermined route, and
      a visual display device for displaying information regarding at least a portion of the predetermined route, including at least some utility meters in the set of utility meters in the predetermined route and some meters not in the predetermined route,
      at least one processor coupled among the wireless receiver, the geographic positioning system, the display device, and the data storage; and,
   at least one head end server computer configured to receive information from the mobile utility data collection system, including the received meter data and the geographic position data stored in the storage device, and
   wherein the server computer is configured to:
      process the received meter data to determine a modified and optimized route for the mobile utility data collection system to later travel to collect future meter data, and
      process the geographic position data to provide displayable information regarding the current route, which may be compared to the predetermined route.

2. The system of claim 1 wherein the geographic positioning system is a Global Positioning System (GPS) system, and
   wherein the displayable information includes displayable information regarding whether utility meters in the set have been read, and displayable information regarding whether utility meters not in the predetermined route have been read and a then current location of mobile utility data collection system;
   wherein the geographic position data includes time, speed, direction, latitude and longitude data; and
   wherein the server computer is further configured to provide map data, and to provide playback user-interface options for a user to, pause, fast-forward, and change playback speed for displaying the information regarding the current route with respect to associated map data.

3. The system of claim 1 wherein the data storage stores utility consumption data from utility meters not in the predetermined route and a then current location of mobile utility data collection system, and wherein the mobile utility data collection system further includes:
   an audio feedback device, coupled to the processor, for providing audible feedback to a user when the mobile utility data collection system receives utility consumption data from utility meters not in the predetermined route.

4. In a system for automatically collecting utility data from multiple utility meters, wherein each of the multiple utility meters includes at least a transmitter for transmitting meter data, a mobile apparatus comprising:
   processing means for processing data and instructions;
   receiver means, coupled to the processing means, for wirelessly receiving meter data transmitted by at least some of the multiple utility meters;
   data storage means, coupled to the processing means, for storing map information and the received meter data, wherein the map information includes information regarding a predetermined route for the mobile apparatus, and wherein the received meter data includes data regarding a set of the multiple utility meters on the predetermined route and utility meters not on the predetermined route;
   analysis means, coupled to the processing means, for determining whether a read meter is a meter within the predetermined route or not in the predetermined route; and
   display means, coupled to the processing means, for displaying at least a portion of the map information together with symbols representing at least some utility meters in the set and different symbols representing some meters not in the predetermined route wherein the symbols are based on the determination of the analysis means.

5. The mobile apparatus of claim 4, further comprising:
   location means for determining geographic locations of the mobile apparatus as the mobile apparatus travels along a current route; and
   wherein the data storage means stores geographic location data associated with the determined geographic locations of the mobile apparatus as the mobile apparatus travels along the current route, and geographic location data associated with received meter data from utility meters not on the predetermined route.

6. The mobile apparatus of claim 4, further comprising:
audible means for providing audible alerts associated with receipt of data from a utility meter not on the predetermined route.

7. The mobile apparatus of claim 4, further comprising:
location means for determining geographic locations of the mobile apparatus as the mobile apparatus travels along a current route; and
wherein the data storage means stores geographic location data associated with the determined geographic locations of the mobile apparatus as the mobile apparatus travels along the current route.

8. The mobile apparatus of claim 4, further comprising:
location means for providing data regarding geographic locations; and
wherein the data storage means stores geographic location data associated with utility meters not on the predetermined route.

9. The mobile apparatus of claim 4 wherein the data storage means stores time data associated with received meter data from utility meters not on the predetermined route.

10. In a system for automatically collecting utility data from multiple utility meters by a mobile apparatus, wherein each of the multiple utility meters includes at least a transmitter for transmitting meter data, a method comprising:
wirelessly receiving meter data transmitted by at least some of the multiple utility meters;
storing map information and the received meter data, wherein the map information includes information regarding a predetermined route for the mobile apparatus to traverse while gathering utility meter data, and wherein the received meter data includes data regarding a set of the multiple utility meters on the predetermined route and utility meters not on the predetermined route;
determining whether a read meter is a meter within the predetermined route or not in the predetermined route; and
displaying at least a portion of the map information together with symbols representing at least some utility meters in the set and different symbols representing some meters not in the predetermined route wherein the symbols are based on the determination step.

11. The method of claim 10, further comprising:
determining geographic locations while travelling along a current route; and
storing geographic location data associated with the determined geographic locations while travelling along the current route, and geographic location data associated with received meter data from utility meters not on the predetermined route.

12. The method of claim 10, further comprising:
providing audible alerts associated with receipt of data from a utility meter not on the predetermined route.

13. The method of claim 10, further comprising:
determining geographic locations while travelling along a current route; and
storing geographic location data associated with the determined geographic locations along the current route.

14. The method of claim 10, further comprising:
providing data regarding geographic locations; and
storing geographic location data associated with utility meters not on the predetermined route.

15. The method of claim 10, further comprising storing time data associated with received meter data from utility meters not on the predetermined route.

* * * * *

UNITED STATES PATENT AND TRADEMARK OFFICE
CERTIFICATE OF CORRECTION

| | | |
|---|---|---|
| PATENT NO. | : 7,283,062 B2 | Page 1 of 1 |
| APPLICATION NO. | : 10/903866 | |
| DATED | : October 16, 2007 | |
| INVENTOR(S) | : Hoiness et al. | |

It is certified that error appears in the above-identified patent and that said Letters Patent is hereby corrected as shown below:

On Sheet 6 of 15, FIG. 6, (Below Reference Numeral 107), line 1, delete "toggel" and insert -- toggle --, therefor.

In column 1, lines 29-33, delete "When used in such areas, MAMR can dramatically improve meter reading efficiency. For example, a single data command unit transceiver reads an average of 10,000-12,000 meters in an eight-hour shift, and can read up to 24,000 meters per day, depending on meter density and system use." and insert the same on Col. 1, Line 28, after "meters.", as a continuation of the same paragraph.

In column 10, line 55, delete "9-12." and insert -- 9-12). --, therefor.

In column 11, line 41, delete ".tlr" and insert -- .trl --, therefor.

In column 16, line 54, in Claim 4, after "route" insert -- , --.

In column 18, line 7, in Claim 10, after "route" insert -- , --.

Signed and Sealed this

First Day of July, 2008

JON W. DUDAS
*Director of the United States Patent and Trademark Office*